US007777616B2

(12) United States Patent
Mase et al.

(10) Patent No.: US 7,777,616 B2
(45) Date of Patent: Aug. 17, 2010

(54) INTERSECTION INFORMATION PROVISION SYSTEM AND DRIVING ASSIST SYSTEM

(75) Inventors: Kenji Mase, Chita-gun (JP); Ichirou Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 11/889,077

(22) Filed: Aug. 9, 2007

(65) Prior Publication Data

US 2008/0055056 A1 Mar. 6, 2008

(30) Foreign Application Priority Data

Aug. 29, 2006 (JP) ............................ 2006-232600

(51) Int. Cl.
*B60Q 1/00* (2006.01)

(52) U.S. Cl. ....................... 340/435; 340/436; 340/909; 340/919; 340/933; 340/943; 340/988; 340/995.13; 382/104; 382/107; 382/130; 382/193; 701/117; 701/118; 701/119; 701/211

(58) Field of Classification Search ................. 340/435, 340/436, 909, 919, 933, 943, 988, 995.13; 382/104, 107, 130, 193; 701/117, 118, 119, 701/211
See application file for complete search history.

(56) References Cited

U.S. PATENT DOCUMENTS 5,999,635 A * 12/1999 Higashikubo et al. ....... 382/104
6,775,614 B2 * 8/2004 Kim ........................... 701/213
7,254,482 B2 * 8/2007 Kawasaki et al. ........... 701/211
2005/0123173 A1 * 6/2005 Isaji et al. ................... 382/104
2005/0222753 A1 * 10/2005 Ishikawa .................... 701/200
2007/0219709 A1 * 9/2007 Ikeda ......................... 701/207

FOREIGN PATENT DOCUMENTS

JP A-2003-016583 1/2003
JP A-2005-141543 6/2005

* cited by examiner

*Primary Examiner*—Tai T Nguyen
(74) *Attorney, Agent, or Firm*—Posz Law Group, PLC

(57) ABSTRACT

In an intersection information provision system, multiple cameras are installed oriented towards the direction where each road extends from the intersection. Each camera captures as an image or video the state ranging from the intersection to each road. Therefore, the area of the captured image by each camera is narrowed down. When this captured image is displayed in a display unit of a navigation apparatus in a vehicle, the driver of the vehicle can perform safety check easily. Furthermore, according to the traveling direction of the vehicle at the intersection, a display pattern of several captured images to be displayed is determined. According to the determined display pattern, multiple captured images are displayed in order. Therefore, image information required to pass through the intersection safely can be offered without shortage to the driver of the vehicle.

11 Claims, 4 Drawing Sheets

INTERSECTION INFORMATION PROVISION SYSTEM AND DRIVING ASSIST SYSTEM

CROSS REFERENCE TO RELATED APPLICATION

This application is based on and incorporates herein by reference Japanese Patent Application No. 2006-232600 filed on Aug. 29, 2006.

FIELD OF THE INVENTION

The present invention relates to an intersection information provision system, which offers image information of an intersection for vehicles to run the intersection safely, and intersection image information. In addition, the present invention relates to a driving assist system which assists a driver of a vehicle in running an intersection safely by displaying an image around the vehicle.

BACKGROUND OF THE INVENTION

For example, Patent document 1 discloses a system which provides a driver with necessary image information corresponding to an advance state of the vehicle. In the system in Patent document 1, an image of the whole intersection is captured with a camera disposed in the intersection. An image transmission device transmits the captured image to vehicles which advance into the intersection. While an in-vehicle apparatus receives the transmitted image, an advance state detection unit detects information concerning the advance state of the vehicle based on an operation result of a blinker. Then an image converter extracts an image which indicates a state of an area the driver needs to perform safety check based on the detected advance state. The extracted image is changed into a changed image actually viewed from the driver, and the changed image is displayed on a monitor.

When a vehicle passes through the intersection, according to the advance state, the direction and place, where the driver should pay attention to in the safety check, change. Therefore, in the system of Patent document 1 mentioned above, the image of the specific area is extracted and displayed out of the image of the whole intersection according to the advance state of the vehicle at the intersection. Thus, the driver can perform the safety check efficiently using the offered image, and the burden for the check can be relieved.

Patent document 1: JP-2005-141543 A

When the state around the intersection is captured as an image or video and provided as it is to drivers of vehicles, the range of the captured image is too extensive. If the driver extracts a required part for operation of the vehicle from the offered image and checks it, the necessary burden becomes large.

In contrast, in Patent document 1, the image of only the specific area of the intersection is extracted and displayed according to the advance state of the vehicle. Thus, there may be a problem that the image of the specific area is not so sufficient as the information for the vehicle to pass through the intersection safely.

For example, a vehicle crosses the oncoming lane to turn to the right at the intersection in the left-hand-hand traffic like in Japan and England. At the time, the driver should pay sufficient attention to other vehicles which run the oncoming lane. Still more sufficient attention should be paid to a pedestrian who crosses the road the vehicle enters after turning right. Thus, the driver needs to pay attention to at least two or more directions and points when passing through the intersection. It is desirable that those states can be checked as images.

SUMMARY OF THE INVENTION

The present invention is made in view of the point mentioned above. It is an object of the present invention to provide an intersection information provision system and a driving assist system. They can offer image information required in order that vehicles may pass through the intersection safely, while displaying an image for easy safety check.

To achieve the above object, as an example of the present invention, an intersection information provision system is provided as follows. An over-road apparatus is included to be provided over a road around an intersection. An in-vehicle apparatus is included to be provided in a vehicle and have a display unit which displays an image. The over-road apparatus includes a plurality of capturing devices and a transmission unit. Each of the capturing devices is oriented towards a direction, where each road extends from the intersection, and is for capturing as an image a state ranging from the intersection to each road. The transmission unit is for transmitting a captured image, which each of the plurality of capturing devices captures, to the in-vehicle apparatus. The in-vehicle apparatus includes a traveling direction detection unit, a determination unit, a reception unit, and a display control unit. The traveling direction detection unit is for detecting a traveling direction of the vehicle at the intersection. The determination unit is for determining several captured image, which is to be displayed in the display unit, from among a plurality of captured images by the plurality of capturing devices of the over-road apparatus, based on the detected traveling direction of the vehicle at the intersection. The reception unit is for receiving at least the determined captured images. The display control unit is for switching to display the received captured images in order in the display unit.

As another example of the present invention, a driving assist system is provided as including an over-road apparatus around an intersection and an in-vehicle apparatus having a display unit for displaying an image. The over-road apparatus includes a plurality of capturing devices and a transmission unit. Each of the plurality of capturing devices is oriented towards a direction, where each road extends from the intersection, and is for capturing as an image a state ranging from the intersection to each road. The transmission unit is for transmitting a captured image, which each of the plurality of capturing devices captures, to the in-vehicle apparatus. The in-vehicle apparatus includes a traveling direction detection unit, a reception unit, an in-vehicle capturing device, a determination unit, and a display control unit. The traveling direction detection unit is for detecting a traveling direction of the vehicle at the intersection. The reception unit is for receiving the captured images by the capturing devices of the over-road apparatus. The in-vehicle capturing device is for capturing as images the right and left sides and the right and left backs of the vehicle. The determination unit is for determining several captured images which are to be displayed in the display unit from among a plurality of captured images by the plurality of capturing devices of the over-road apparatus and by the in-vehicle capturing device, based on the detected traveling direction of the vehicle at the intersection. The display control unit is for switching to display the determined captured images in order in the display unit.

As yet another example of the present invention, a method is provided for displaying images for assisting a driver in passing through an intersection. The method comprises: capturing as an image each area ranging from the intersection to each cross road crossing at the intersection by using a corresponding over-road capturing device around the intersection to thereby generate and transmit captured images for all the cross roads; detecting a traveling direction of the vehicle in which the vehicle is to pass through the intersection; determining captured images, which are to be displayed in the display unit, from among the transmitted captured images for all the cross roads based on the detected traveling direction of the vehicle; and switching to display the determined captured images in order in the display unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
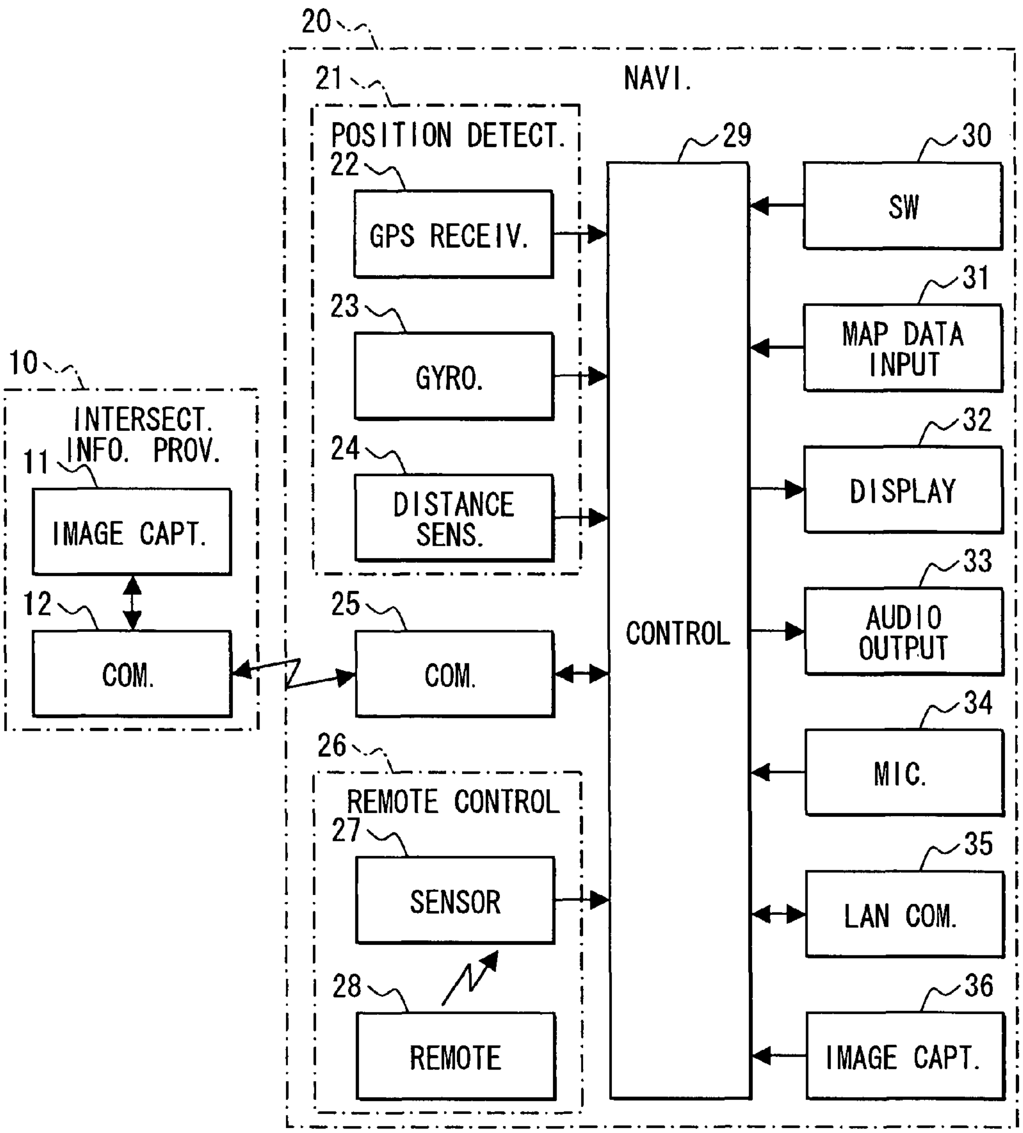
FIG. 1 is a block diagram showing a configuration of a driving assist system as an embodiment of the present invention.

FIG. 1 is a block diagram showing a configuration of a vehicular driving assist system as an embodiment of the present invention. The driving assist system includes an intersection information provision apparatus 10 which is an over-road apparatus installed over a road near an intersection, and a car navigation apparatus 20 as an in-vehicle apparatus mounted in a subject vehicle.

The intersection information provision apparatus 10 has an image capture device 11. This image capture device 11 is installed to be oriented towards a direction where each road extends from the intersection. The image capture device 11 has multiple cameras, as capturing devices, which capture, as images or videos, states or situations ranging from the intersection concerned to individual roads, and a communicator 12 as a transmission unit, which sends images captured with the cameras to in-vehicle units.

The camera is a CCD camera or a CMOS camera, and generates an image (or video) which captures state or situation ranging from the intersection to each road, for example, for every predetermined time period. The communicator 12 transmits the captured image which the camera captured, when the car navigation apparatus 20 outputs a transmission request. This communicator 12 is provided, for example, near the intersection of each road, in order to communicate with vehicles which run each road towards the intersection.

Figure 2A:
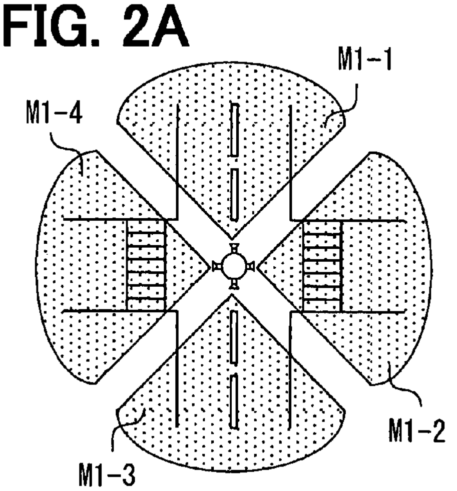
FIGS. 2A, 2B are diagrams for explaining installation modes of multiple cameras, which capture individual roads, in an intersection information provision apparatus.
Figure 2B:
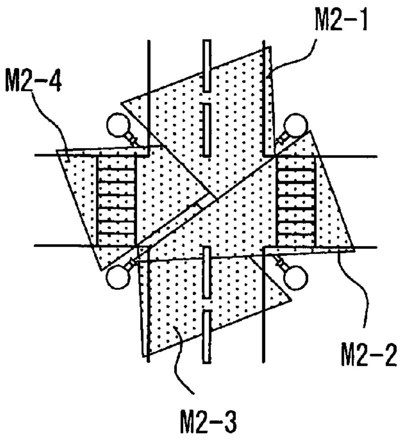

Here, the installation mode of the cameras is explained based on FIGS. 2A, 2B. FIG. 2A indicates an installation mode in which four cameras are installed in the center of the intersection to capture, as images (or videos), four directions oriented towards individual roads which extend from the intersection. Therefore, capturing areas of the four cameras are set to Areas M1-1 to M1-4 extending from the intersection, as indicated in FIG. 2A. In addition, in this case, the four cameras are hung with the wire, for example, in the center of the intersection, or are attached to the bridge constructed over the intersection.

Moreover, FIG. 2B indicates another installation mode which installs the four cameras in individual intersectional corner parts. Also in this case, each camera is installed towards the direction where each road extends from the intersection. For this reason, the capturing areas of the four cameras are set to Areas M2-1 to M2-4 extending from the intersection like in FIG. 2A. In addition, the four cameras are attached to the corner mirrors or the telegraph poles.

In any installation mode, an image captured by each camera is in a narrowed-down range extended to each road from the intersection and used to be checked in order that vehicles may pass through the intersection safely.

Next, the car navigation apparatus 20 is explained. As indicated in FIG. 1, the car navigation apparatus 20 has a position detection unit 21. This position detection unit 21 includes a GPS (Global Positioning System) receiver 22, a gyroscope 23, and a distance sensor 24, and detects a current position and traveling direction of the vehicle. GPS receiver 22 receives GPS signals for position determination transmitted from GPS Satellites, and detects a latitude, longitude, and altitude of a position where the vehicle runs currently. The gyroscope 23 detects an angle of yaw speed (yaw rate) of the vehicle from a vibration based on Coriolis force generated when vibrating the vibrator. Moreover, the distance sensor 24 detects a travel distance of the vehicle based on rotation signals of a wheel or axle (none shown) of the vehicle.

The position detection unit 21 detects a position in a high accuracy by mutually interpolating detection results of the sensors or the like mentioned above. Of course, it is not necessary to have all of the sensors or the like mentioned above depending on a detection accuracy demanded. Moreover, detection signals by other sensors, such as a steering sensor may be used.

A map data input unit 31 has a hard disk, for example, as a storage medium, and stores road map data and retrieval data. The road map data are used for displaying road maps. The retrieval data include names, genres, addresses, postal code numbers, etc. for searching for various kinds of institutions in the road map data.

A control unit 29 reads required road map data from the map data input unit 31, or retrieves an institution specified by the user using search information.

A display unit 32 has, for instance, a liquid crystal display and performs various kinds of display for navigation including a road map. Furthermore, the display unit 32 displays an image, which indicates a state ranging from the intersection to each road and is acquired from the intersection information provision apparatus 10, and an image captured by an in-vehicle image capture device 36 mentioned later.

An operation switch group 30 consists of touch panel sensors integrated in a screen of the display unit 32, and/or multiple mechanical switches formed around the screen of the display unit 32. The operation switch group 30 is used for inputting various kinds of operation instructions to the car navigation apparatus 20. Moreover, a remote control operation unit 26 is included in the car navigation apparatus 20, and various kinds of operation instructions can be inputted to the car navigation apparatus 20 like the operation switch group 30. This remote control operation unit 26 includes a remote control 28 and a remote control sensor 27. The remote control 28 has various kinds of operation switches for a user to operate. The remote control sensor 27 receives operation signals transmitted from the remote control 28 and outputs the received signals to the control unit 29.

An audio output unit 33 outputs guide sounds about a guide route when the car navigation apparatus 20 navigates to a destination set up by the user. Furthermore, when images surrounding the vehicle and intersection images are switched to each other in displaying, the audio output unit 33 outputs sounds which report the kind of the displayed image (mentioned later). A microphone 34 inputs user's voice when the user gives operation instructions to the car navigation apparatus 20 with speeches. The inputted speeches are analyzed in the control unit 29, and a process corresponding to the operation directed by the speeches is performed.

An In-vehicle local area network (LAN) communication device 35 communicates with various kinds of in-vehicle devices, and exchanges the required information through a local area network (LAN) (not shown). For example, in this embodiment, the car navigation apparatus 20 communicates with a blinker device (not shown), and acquires information about traveling direction of the vehicle at an intersection.

An external communication device 25 transmits an capture request of an image to the intersection information provision apparatus 10, or receives a captured image transmitted from the intersection information provision apparatus 10 (i.e., the device 25 may function as a reception means or unit for receiving captured images from the intersection information provision apparatus 10), and outputs it to the control unit 29.

Figure 3:
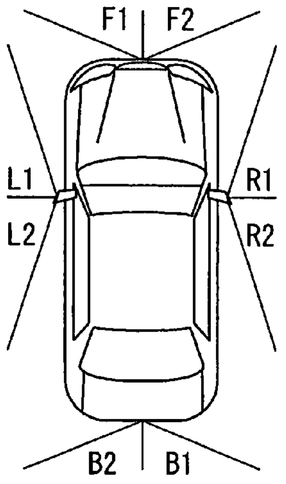
FIG. 3 is a diagram for explaining ranges of images captured by an in-vehicle image capture device.

The in-vehicle image capture device 36, as an in-vehicle capturing device, consists of cameras which capture states around the vehicle as an image (or video) and generate captured images. For example, as indicated in FIG. 3, cameras are carried in the vehicle to individually capture images (or videos) of a right and left fronts F1, F2, two left sides L1, L2, two right sides R1, R2, and a right and left backs B1, B2. According to traveling condition (or advance state) of the vehicle, a required image is displayed on the display unit 32 of the car navigation apparatus 20. In addition, each one camera may be provided to capture an image (or video) of each one of the front, the left side, the right side, and the back of the vehicle. In this case, a prism or mirror may be used to expand a captured area, as shown in FIG. 3. Two cameras may be provided to capture an image (or video) of each one of the front, the left side, the right side, and the back of the vehicle.

Figure 4:
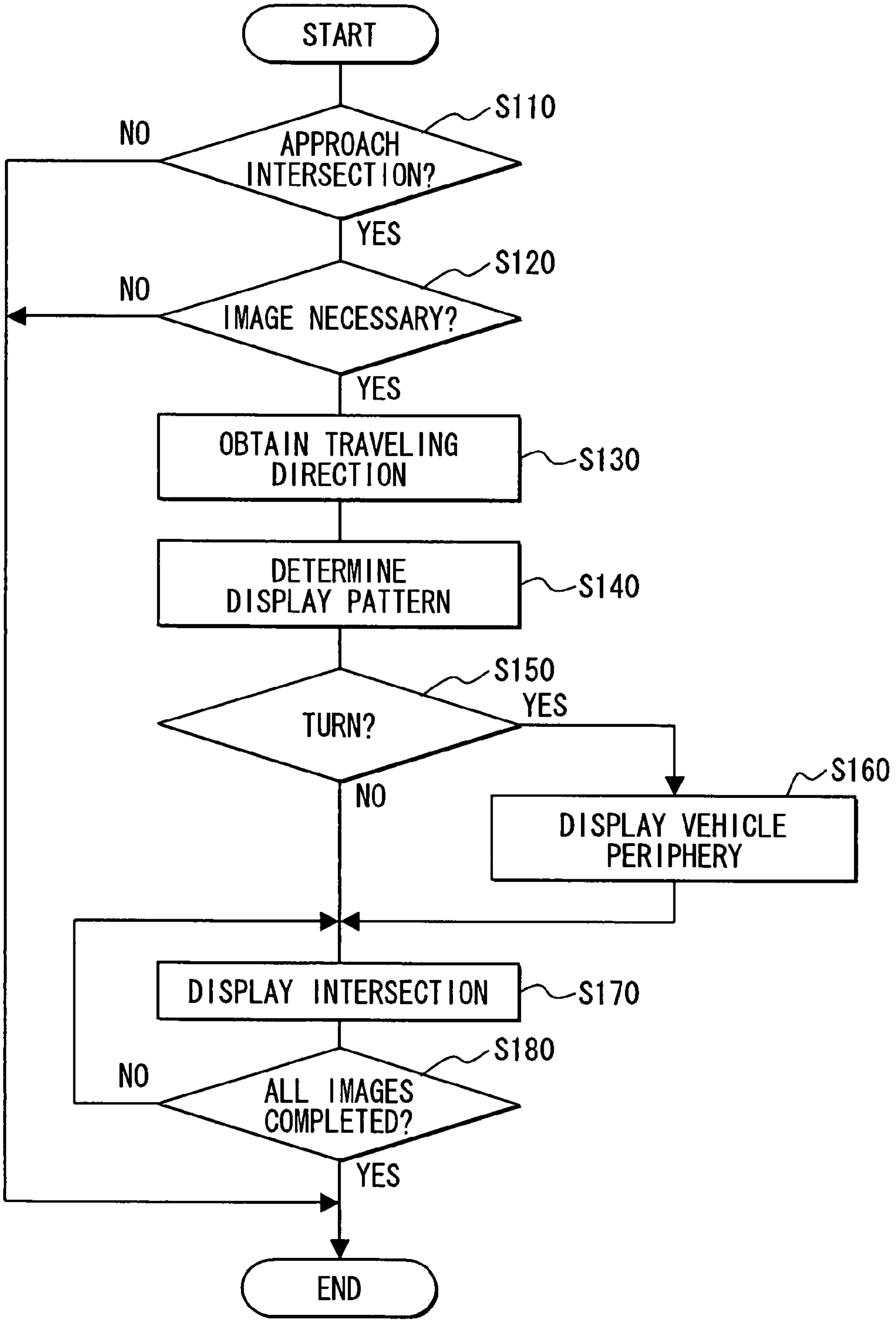
FIG. 4 is a flow chart diagram illustrating a driving assist process which performs driving assist for a vehicle to pass through an intersection safely.

Next, a driving assist process as a feature of this embodiment is explained based on a flowchart of FIG. 4. The driving assist process displays an image (vehicle periphery image) around the subject vehicle in addition to the intersection image for assisting the driver so that the vehicle can run the intersection safely. This driving assist process is performed for every predetermined time by the control unit 29 constituted as a usual computer.

As indicated in FIG. 4, it is determined whether the vehicle approaches an intersection forward on a running road, which the vehicle currently runs at Step S110. This determination can be performed based on the relation between a current position of the vehicle and the road map data in the car navigation apparatus 20. The communicator 12 of the intersection information provision apparatus 10 may communicate only with a vehicle on each road which leads to the intersection. In this case, approaching the intersection can be also determined by having started communication with the communicator 12.

At Step S120 performed when it is determined that the vehicle approaches the intersection, it is determined whether the capture of the image from the intersection information provision apparatus 10 is necessary or not. According to this embodiment, the user can choose turning on or off the display of the intersection image. Therefore, when the user operates the operation switch group 30 and turns off the display of the intersection image, it is determined at Step S120 that the capture of the image is unnecessary, and the process in the flowchart of FIG. 4 ends. On the other hand, when the display of the intersection image is turned on, it is determined that the image from the intersection information provision apparatus 10 needs to be captured, and Step S130 is then performed.

At Step S130, information about the traveling direction of the vehicle at the intersection is acquired. The information about this traveling direction is acquired from the blinker device through the in-vehicle LAN communication device 35, as mentioned above. Moreover, a guide route may be set up in the car navigation apparatus 20, and a route guide may take place. In this case, the information about the traveling direction of the vehicle at the intersection can be acquired based on the guide route. Thus, Step S130 by the control unit 29 may function as a traveling direction detection means or unit.

At subsequent Step S140, a display pattern of the intersection image is determined to correspond to the traveling direction of the vehicle at the intersection.

Here, in order to pass through the intersection safely, it is required to check several directions and points. On the other hand, when the image includes the several directions and points in the capturing area, the image range is extensive. Therefore, it is difficult for the driver to extract and check the required point for driving the vehicle from the offered image.

Therefore, this embodiment uses an image having a capturing area which is narrowed down to a range from the intersection to each road. The driver of the vehicle is enabled to perform safety check easily from the image. Furthermore, according to the traveling direction of the vehicle at the intersection, the display patterns including several captured images to be checked is determined. The several captured images are switched to each other to be displayed in order on the display unit 32 according to the determined display pattern. While images of the narrowed-down ranges are displayed for the driver of the vehicle, image information required to pass through the intersection safely can be thereby offered without shortage. Thus, Step S140 by the control unit 29 may function as a determination means or unit for determining several captured images which are to be displayed on the display unit 32.

Here, some examples of display patterns of intersection images according to the traveling direction of the vehicle at the intersection are explained using FIGS. 5 to 7.

Figure 5A:
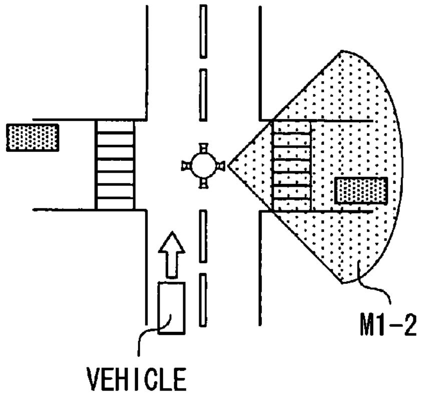
FIGS. 5A, 5B are diagrams for explaining examples of display patterns of an intersection image when a vehicle goes straight at the intersection.
Figure 5B:
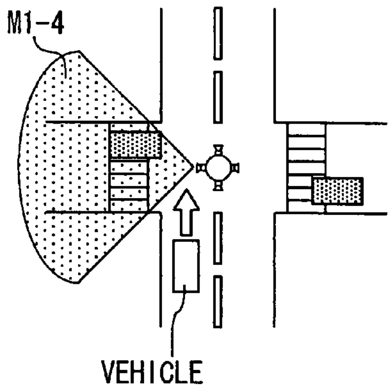

FIGS. 5A, 5B indicate an example of a display pattern of intersection images when the vehicle goes straight at the intersection. In this display pattern, the first displayed image shows Area M1-2. Area M1-2 covers a cross road, which is one of cross roads at the intersection and extends rightward viewed from the subject vehicle. After Area M1-2 is shown for a predetermined time period, the second displayed image shows Area M1-4, which covers a cross road extending leftward viewed from the subject vehicle. Area M1-4 is also shown for a predetermined time period.

Here, the display start time and subsequent display time period are beforehand set up so that the display of all the images can be ended by the time when the vehicle enters the intersection. For example, when the vehicle runs the first range based on the distance up to the intersection, the image of above-mentioned Area M1-2 is displayed. When the vehicle runs the second range closer to the intersection than the first range, the image of above-mentioned Area M1-4 is displayed. Moreover, when displaying each image, the kind of displayed image is reported by voice and on screen display. Thereby, the driver can recognize correctly the state of Area M1-2 and the state of Area M 1-4 as mutually different displayed images.

When the vehicle runs the intersection in the direction which goes straight on, the driver of the vehicle should be cautious of another vehicle which runs another cross road towards the intersection especially. For this reason, the driver can be provided with image information required to pass through the intersection safely without shortage by displaying the intersection images according to the display pattern as indicated in FIGS. 5A, 5B.

Figure 6A:
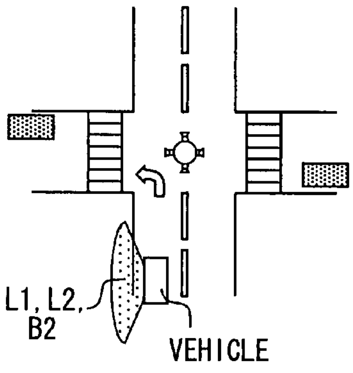
FIGS. 6A to 6C are diagrams showing examples of display patterns of images displayed on a display unit when a vehicle turns left without crossing the oncoming lane.
Figure 6B:
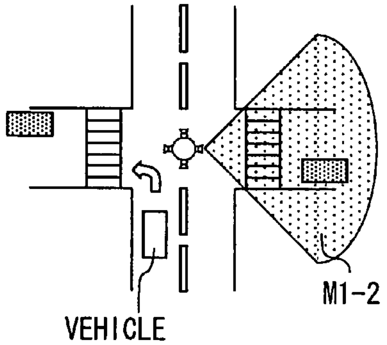
Figure 6C:
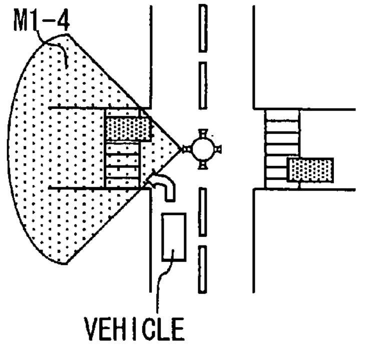

FIGS. 6A, 6B, 6C indicate an example of a display pattern of intersection images displayed on the display unit 32 when the vehicle turns at the intersection without crossing the oncoming lane. The display pattern in FIGS. 6A to 6C includes images of the left sides L1, L2 and left back B2 captured by the in-vehicle image capture device 36 in addition to the intersection images.

Thus, in addition to displaying the intersection images, the displayed images are added to capture the side and back of the vehicle corresponding to the direction in which the vehicle intends to turn. This helps prevent an accident embroiling a two-wheeled vehicle which runs the side and the back of the vehicle.

For example, in FIG. 6A, an image captured by the in-vehicle image capture device 36 is displayed before the intersection images are displayed. The image meets with the procedure of the safety check that the driver performs at the time of left turn in the left-hand traffic. In other words, the driver slows down the vehicle to approach the direction in which it turns or to actually start to turn when coming to the intersection. In this case, the driver needs to pay attention to a two-wheeled vehicle, another vehicle, etc. which runs the side or the back of the vehicle, and the driver actually views the side and the back of the vehicle. However, there must be visually a dead angle, or the check needs to be performed for a very short time. Thus, this embodiment displays the image of the side and back of the vehicle corresponding to the direction in which the vehicle intends to turn. This allows the driver to perform secure safety check, therefore relieving the driver's burden.

In addition, the images of the side and back of the vehicle may be simultaneously displayed or switched to each other in order to be displayed on the display unit 32.

The intersection images are displayed following the image captured by the in-vehicle cameras. As indicated in FIG. 6B, Area M1-2 is displayed first. This shows the cross road which extends from the intersection to the opposite direction to the road which the vehicle enters after turning left. Next, Area M1-4 shown in FIG. 6C is displayed. This shows the cross road which the vehicle enters after turning left. The above is the case where the vehicle turns left at the intersection without the vehicle crossing the oncoming lane. In this case, the driver of the subject vehicle needs to pay attention to another vehicle which runs straight to the road which the subject vehicle enters after turning left, and further, a pedestrian under crossing and another vehicle under stop, etc. on the road which the subject vehicle enters after turning left.

Figure 7A:
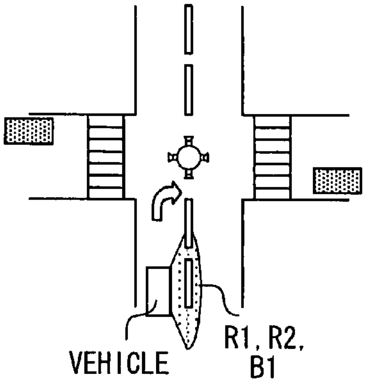
FIGS. 7A to 7C are diagrams showing examples of display patterns of images displayed on a display unit when a vehicle while crossing the oncoming lane.
Figure 7B:
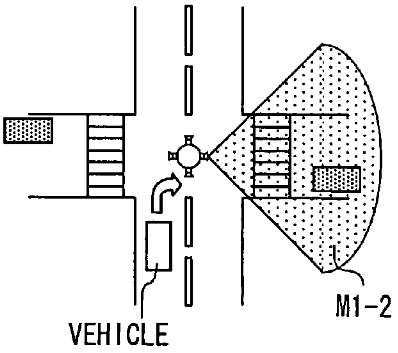
Figure 7C:
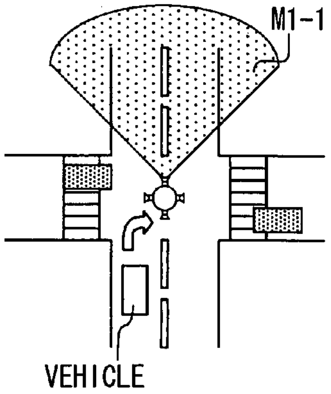

FIGS. 7A, 7B, and 7C indicate an example of another display pattern of images displayed on the display unit 32 at an intersection in the left-hand traffic, when the subject vehicle crosses the oncoming lane to turn to the right.

This display pattern also displays images captured by the in-vehicle image capture device 36; namely, it displays images of the right sides R1, R2 and the right back B1 of the subject vehicle before displaying intersection images. This helps prevent an accident embroiling a two-wheeled vehicle which runs the right side or the back of the subject vehicle.

The intersection images are displayed following the image captured by the in-vehicle image capture device 36. As shown in FIG. 7B, Area M1-4 of the intersection image is displayed to cover the cross road which the subject vehicle enters after turning to the right. Next, as shown in FIG. 7C, Area M1-1 of the intersection image is displayed to cover the road including the oncoming lane. The above is the case where the vehicle crosses the oncoming lane to turn to the right. In this case, the driver of the subject vehicle needs to pay attention to another vehicle which runs the oncoming lane to the intersection and, further, a pedestrian under crossing and another vehicle under stop on the road which the subject vehicle enters after turning to the right.

In addition, Area M1-4 may be displayed to cover the road which extends from the intersection to the opposite direction to the road which the subject vehicle enters after turning to the right. For example, it is because the driver needs to pay attention to another vehicle which runs straight to the road which the subject vehicle enters after turning to the right in the case of the intersection without the traffic rights.

The display patterns of the intersection images shown in FIGS. 5A to 5B, 6A to 6C, 7A to 7C mentioned above are the mere exemplification, and the orders of the displayed images may be changed suitably. Moreover, the display patterns of intersection images may be set up beforehand and stored in the control unit 29.

Returning to the flowchart in FIG. 4, at Step S140, the display pattern of the intersection images is determined according to the traveling direction of the vehicle. Next, at Step S150, it is determined whether or not the subject vehicle turns right/left at the intersection. When it is determined that the vehicle turns, Step S160 is then performed. Here, an image from the in-vehicle image capture device 36 is displayed to show the side and the back of the vehicle corresponding to the direction in which the subject vehicle turns. As indicated in FIG. 6A, FIG. 7A, the images captured by the in-vehicle image capture device 36 are individually displayed on the display unit 32 before several intersection images are displayed for prevention of the accident involving another vehicle or the like.

At Step S170, according to the display pattern of the intersection images, the applicable images are received from the intersection information provision apparatus 10 and displayed on the display unit 32. In this case, the information about the capturing areas of cameras of the intersection information provision apparatus 10 may be stored in the map data of the car navigation apparatus 20. The car navigation apparatus 20 determines which camera captures the required image, based on the road and traveling direction the subject vehicle runs. Thus, the camera capturing the required image can be specified and image information can be accordingly required. Otherwise, the car navigation apparatus 20 can transmit a running road, which the subject vehicle currently runs, and the information about the intersection image necessary for display, to the intersection information provision apparatus 10. Then, the intersection information provision apparatus 10 may determine which camera captures the necessary intersection image based on the running road. In any case, the car navigation apparatus 20 can receive image information to be displayed in order to pass through the intersection safely.

Furthermore, the intersection information provision apparatus 10 can transmit the images captured by all the cameras, for example, for every predetermined time period. In this case, the car navigation apparatus 20 may choose only the image to be displayed from among the received images. When the intersection information provision apparatus 10 transmits an image, ID for identifying the camera may be added. When the intersection information provision apparatus 10 transmits the image information by the camera for each road, the information which indicates the capturing area may be added based on each road. In the two above-mentioned cases, only the required images can be chosen in the car navigation apparatus 20.

At Step S180, it is determined whether all the intersection images are displayed according to the display pattern determined at Step S140. When it is not determined that all the images are completely displayed, Step S170 is repeated and the required image is displayed. When it is determined that all the images are completely displayed, the process in the flowchart of FIG. 4 is ended. Thus, Steps S170, S180 by the control unit 29 may function as a display control means or unit.

As mentioned above, displayed images are narrowed down for the driver to easily check the safety at the intersection while information required for the vehicle to pass through the intersection safely can be offered without shortage. Therefore, it becomes possible to perform the useful driving assist to the driver of the vehicle.

(Modifications)

For example, in the embodiment mentioned above, in addition to the intersection images, the images of the side and the back of the subject vehicle captured by the in-vehicle image capture device 36 are also displayed. This allows driving assist to be performed so that the vehicle could turn right or left at the intersection safely.

However, an intersection information provision system may be provided to omit the in-vehicle image capture device 36 and only switch and display multiple intersection images for passing through the intersection safely.

Moreover, although the embodiment mentioned above explained the example which uses the car navigation apparatus 20 as an in-vehicle apparatus, it is not necessary to use the car navigation apparatus 20. The in-vehicle apparatus should just be equipped with: a communicator which communicates with the intersection information provision apparatus 10 as an over-road apparatus, a display unit displaying an image, and a control unit for determining an image to be displayed.

Furthermore, the embodiment mentions examples of displaying several intersection images at the four-went-way intersection. The intersection may be three-went-way or more than four-went-way.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer. Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, an intersection information provision system is provided as follows. An over-road apparatus is included to be provided over a road around an intersection. An in-vehicle apparatus is included to be provided in a vehicle and have a display unit which displays an image. The over-road apparatus includes a plurality of capturing devices and a transmission unit. Each of the capturing devices is oriented towards a direction, where each road extends from the intersection, and is for capturing a state ranging from the intersection to each road as an image (or video). The transmission unit is for transmitting a captured image, which each of the plurality of capturing devices captures, to the in-vehicle apparatus. The in-vehicle apparatus includes a traveling direction detection unit, a determination unit, a reception unit, and a display control unit, The traveling direction detection unit is for detecting a traveling direction of the vehicle at the intersection. The determination unit is for determining several captured image, which is to be displayed in the display unit, from among a plurality of captured images by the plurality of capturing devices of the over-road apparatus, based on the detected traveling direction of the vehicle at the intersection. The reception unit is for receiving at least the determined captured images. The display control unit is for switching to display the received captured images in order in the display unit.

In the above configuration, the multiple capturing devices such as cameras are installed oriented towards directions where cross roads individually extend from the intersection, and each capturing device captures the state ranging from the intersection to each road. The area included in the captured image of each capturing device is thus narrowed down. When this captured image is displayed in the display unit, the driver of the vehicle can perform safety check easily. Furthermore, several captured images to be displayed are determined according to the traveling direction of the vehicle at the intersection. The determined captured images are then displayed in the display unit in order. Therefore, image information required in order to pass through the intersection safely can be offered without shortage to the driver of the vehicle.

As a second aspect, for instance, the traveling direction detection unit may detect that the vehicle is to run straight the intersection. In this case, the determination unit may determine captured images capturing states of cross roads which intersect with a running road the vehicle runs as the several captured images which should be displayed in the display unit. When the vehicle goes straight at the intersection, the driver of the vehicle should pay attention to another vehicle approaching the intersection along a cross road. Therefore, it is desirable to determine, as a captured image which should be displayed, several captured images which captures the states covering cross roads extending rightward and leftward from the intersection.

As a third aspect, the traveling direction detection unit may detect that the vehicle is to cross the oncoming lane at the intersection to turn. In this case, the determination unit may desirably determine, as several captured images which should be displayed in the display unit, a captured image which captures the state of the road of the oncoming lane and a captured image which captures the state of the road the vehicle is to enter after turning. When the vehicle crosses the oncoming lane to turn at the intersection, the driver of the vehicle needs to pay attention to another vehicle which runs the oncoming lane towards the intersection and, further, a pedestrian under crossing and another vehicle under stop on the cross road the vehicle enters after turning.

As a fourth aspect, which is optional to the third aspect, when the vehicle is to cross the oncoming lane to turn at the intersection, the determination unit may further determine the following: a captured image capturing the state of the road extending from the intersection to the opposite direction to the road which the vehicle is to enter after turning is determined as a captured image which should be also displayed in the display unit. For example, there may be an intersection having no traffic lights. In such an intersection, attention should be paid to another vehicle or the like which may run straight towards the road the subject vehicle enters after turning.

As a fifth aspect, the traveling direction detection unit may detect that the vehicle is to turn without crossing the oncoming lane at the intersection. In this case, the determination unit may desirably determine, as several captured images which should be displayed in the display unit, a captured image which captures the state of the road the vehicle is to enter after turning, and a captured image which captures the state of the road extending from the intersection to the opposite direction to the road the vehicle is to enter after turning. When the vehicle turns at the intersection without crossing the oncoming lane, the driver of the vehicle needs to pay attention to another vehicle which runs straight to the road the vehicle enters after turning and, further, a pedestrian under crossing and another vehicle under stop on the road the vehicle enters after turning.

As a sixth aspect, an in-vehicle capturing apparatus may be provided to capture as images the right and left sides and the right and left backs of the vehicle. Further, the traveling direction detection unit may detect that the vehicle advances in the direction other than going straight at the intersection. In this case, the determination unit may determine, as several captured images which should be also displayed in the display unit, captured images of the side and back of the vehicle corresponding to the direction in which the vehicle intends to turn. This helps prevent an accident involving another vehicle or the like by checking the captured image which captures the vehicle's side and back corresponding to the direction in which the vehicle intends to turn.

As a seventh aspect, which is optional to the sixth aspect, after displaying the captured image by the in-vehicle capturing device in the display unit, the display control unit may display the captured images by the capturing device of the over-road apparatus. The driver slows down the vehicle to approach the direction in which it turns or to start to turn actually when coming to the intersection. In this case, the driver should first pay attention to a two-wheeled vehicle which approaches from the back.

As an eighth aspect, a driving assist system is provided as including an over-road apparatus around an intersection and an in-vehicle apparatus having a display unit for displaying an image. The over-road apparatus includes a plurality of capturing devices and a transmission unit. Each of the plurality of capturing devices is oriented towards a direction, where each road extends from the intersection, and is for capturing as an image a state ranging from the intersection to each road. The transmission unit is for transmitting a captured image, which each of the plurality of capturing devices captures, to the in-vehicle apparatus. The in-vehicle apparatus includes a traveling direction detection unit, a reception unit, an in-vehicle capturing device, a determination unit, and a display control unit. The traveling direction detection unit is for detecting a traveling direction of the vehicle at the intersection. The reception unit is for receiving the captured images by the capturing devices of the over-road apparatus. The in-vehicle capturing device is for capturing the right and left sides and the right and left backs of the vehicle. The determination unit is for determining several captured images which are to be displayed in the display unit from among a plurality of captured images by the plurality of capturing devices of the over-road apparatus and by the in-vehicle capturing device, based on the detected traveling direction of the vehicle at the intersection. The display control unit is for switching to display the determined captured images in order in the display unit.

In the driving assist system of this configuration, multiple captured images which capture the states ranging to each road from the intersection, and multiple captured images which capture the right and left sides and the right and left backs of the vehicle by the in-vehicle capturing device may be first prepared. Then, from those captured images, captured images which should be displayed in the display unit are determined and switched to be displayed in order in the display unit.

Thereby, the driver can also check the captured image which indicates the surrounding state of the subject vehicle, if needed, in addition to the captured image which indicates the state of each road at the intersection. Therefore, the effective driving assist for the driver to pass through the intersection safely can be provided.

As a ninth aspect, which is optional to the eighth aspect, it may be detected that the vehicle advances in the direction other than running straight at the intersection. In this case, the determination unit may determine, as several captured images which should be displayed in the display unit, captured images which capture the vehicle's side and back corresponding to the direction in which the vehicle intends to turn. The display control unit may preferably further display the captured images by the capturing devices of the over-road apparatus after displaying the captured images by the in-vehicle capturing device.

As a tenth aspect, a method may be provided for displaying images for assisting a driver in passing through an intersection. The method comprises: capturing as an image each area ranging from the intersection to each cross road crossing at the intersection by using a corresponding over-road capturing device around the intersection to thereby generate and transmit captured images for all the cross roads; detecting a traveling direction of the vehicle in which the vehicle is to pass through the intersection; determining captured images which are to be displayed in the display unit from among the transmitted captured images for all the cross roads based on the detected traveling direction of the vehicle; and switching to display the determined captured images in order in the display unit.

As an eleventh aspect, which is optional to the tenth aspect, the method may further comprise: capturing as an image a side and/or a back of the vehicle by using an in-vehicle capturing device. Here, it may be determined that the vehicle is to turn to a certain direction instead of running straight at the intersection in the detecting the traveling direction of the vehicle. In this case, captured images of the side and/or the back of the vehicle, which are captured by the in-vehicle capturing device and correspond to the certain direction, are further determined in the determining captured images which are to be displayed in the display unit.

It will be obvious to those skilled in the art that various changes may be made in the above-described embodiments of the present invention. However, the scope of the present invention should be determined by the following claims.

What is claimed is:

1. An intersection information provision system comprising:

an over-road apparatus provided for a same intersection, from which a plurality of roads extend; and an in-vehicle apparatus provided in a vehicle and having a display unit for displaying an image, the single over-road apparatus being further configured to comprise:

a plurality of capturing devices being oriented towards directions of the roads extending from the same intersection, respectively, the capturing devices capturing, respectively, as a plurality of images, states ranging from the same intersection to the plurality of roads; and a transmission unit which transmits, to the in-vehicle apparatus, a captured image captured by each of the plurality of capturing devices, the in-vehicle apparatus being further configured to comprise:

a traveling direction detection unit which detects a traveling direction of the vehicle at the same intersection in case that the vehicle travels through the same intersection;

a determination unit to determine several captured images which are to be displayed in the display unit from among a plurality of captured images by the plurality of capturing devices of the single over-road apparatus, based on the detected traveling direction of the vehicle at the same intersection;

a reception unit which receives the determined captured images; and a display control unit which causes the display unit to display the received captured images in order according to the detected traveling direction of the vehicle in case that the vehicle travels through the same intersection.

2. The intersection information provision system of claim 1, wherein when the traveling direction detection unit detects that the vehicle is to run straight the intersection, the determination unit determines captured images capturing states of cross roads which intersect with a running road the vehicle runs as the several captured images which are to be displayed in the display unit.

3. An intersection information provision system comprising:

an over-road apparatus provided over a road around an intersection; and an in-vehicle apparatus provided in a vehicle and having a display unit for displaying an image, wherein the over-road apparatus includes:

a plurality of capturing devices, each capturing device oriented towards a direction where each road extends from the intersection, the each capturing device capturing as an image a state ranging from the intersection to each road; and a transmission unit which transmits, to the in-vehicle apparatus a captured image captured by each of the plurality of capturing devices, wherein the in-vehicle apparatus includes:

a traveling direction detection unit which detects a traveling direction of the vehicle at the intersection;

a determination unit to determine several captured images which are to be displayed in the display unit from among a plurality of captured images by the plurality of capturing devices of the over-road apparatus, based on the detected traveling direction of the vehicle at the intersection;

a reception unit which receives at least the determined captured images; and a display control unit which switches to display the received captured images in order in the display unit, wherein when the traveling direction detection unit detects that the vehicle is to cross an oncoming lane at the intersection to turn, the determination unit determines, as the several captured images which are to be displayed in the display unit, a captured image which captures a state of a road of the oncoming lane and a captured image which captures a state of a road the vehicle is to enter after turning.

4. The intersection information provision system of claim 3, wherein when the vehicle is to cross the oncoming lane to turn at the intersection, the determination unit further determines a captured image capturing a state of a road extending from the intersection to a direction opposite to a direction of a road which the vehicle is to enter after turning as one of the several captured images which are to be displayed in the display unit.

5. An intersection information provision system comprising:

an over-road apparatus provided over a road around an intersection; and an in-vehicle apparatus provided in a vehicle and having a display unit for displaying an image, wherein the over-road apparatus includes:

a plurality of capturing devices, each capturing device oriented towards a direction where each road extends from the intersection, the each capturing device capturing as an image a state ranging from the intersection to each road; and a transmission unit which transmits, to the in-vehicle apparatus, a captured image captured by each of the plurality of capturing devices, wherein the in-vehicle apparatus includes:

a traveling direction detection unit which detects a traveling direction of the vehicle at the intersection;

a determination unit to determine several captured images which are to be displayed in the display unit from among a plurality of captured images by the plurality of capturing devices of the over-road apparatus, based on the detected traveling direction of the vehicle at the intersection;

a reception unit which receives at least the determined captured images; and a display control unit which switches to display the received captured images in order in the display unit, wherein when the traveling direction detection unit detects that the vehicle is to turn without crossing an oncoming lane at the intersection, the determination unit determines, as the several captured images which are to be displayed in the display unit, a captured image which captures a state of a road the vehicle is to enter after turning, and a captured image which captures a state of a road extending from the intersection to a direction opposite to a direction of a road the vehicle is to enter after turning.

6. An intersection information provision system comprising:

an over-road apparatus provided over a road around an intersection; and an in-vehicle apparatus provided in a vehicle and having a display unit for displaying an image, wherein the over-road apparatus includes:

a plurality of capturing devices, each capturing device oriented towards a direction where each road extends from the intersection, the each capturing device capturing as an image a state ranging from the intersection to each road;

a transmission unit which transmits, to the in-vehicle apparatus, a captured image captured by each of the plurality of capturing devices; and an in-vehicle capturing device provided in the vehicle for capturing as images a right side, a left side, a right back, and a left back of the vehicle, wherein the in-vehicle apparatus includes:

a traveling direction detection unit which detects a traveling direction of the vehicle at the intersection;

a determination unit to determine several captured images which are to be displayed in the display unit from among a plurality of captured images by the plurality of capturing devices of the over-road apparatus, based on the detected traveling direction of the vehicle at the intersection;

a reception unit which receives at least the determined captured images; and a display control unit which switches to display the received captured images in order in the display unit;

wherein when the traveling direction detection unit detects that the vehicle is to advance in a certain direction other than a direction to run straight at the intersection, the determination unit further determines, as the several captured images which are to be displayed in the display unit, captured images of a side and a back of the vehicle, which are captured by the in-vehicle capturing device and correspond to the certain direction in which the vehicle is to advance.

7. The intersection information provision system of claim 6, wherein after displaying the captured images by the in-vehicle capturing device in the display unit, the display control unit displays the captured images by the capturing devices of the over-road apparatus.

8. A driving assist system comprising:

an over-road apparatus provided over a road around an intersection; and an in-vehicle apparatus provided in a vehicle and having a display unit for displaying an image, wherein the over-road apparatus includes:

a plurality of capturing devices, each of which is oriented towards a direction, where each road extends from the intersection and for capturing as an image a state ranging from the intersection to each road; and a transmission unit which transmits, to the in-vehicle apparatus, a captured image captured by each of the plurality of capturing devices, and wherein the in-vehicle apparatus includes:

a traveling direction detection unit to detect a traveling direction of the vehicle at the intersection;

a reception unit which receives the captured images by the capturing devices of the over-road apparatus;

an in-vehicle capturing device which captures as images a right side, a left side, a right back, and a left back of the vehicle;

a determination unit to determine several captured images which are to be displayed in the display unit from among a plurality of captured images by the plurality of capturing devices of the over-road apparatus and by the in-vehicle capturing device, based on the detected traveling direction of the vehicle at the intersection; and a display control unit which switches to display the determined captured images in order in the display unit.

9. The driving assist system of claim 8, wherein when the traveling direction detection unit detects that the vehicle advances in a certain direction other than a direction to run straight at the intersection, (i) the determination unit determines, as the several captured images which are to displayed in the display unit, captured images which captures a vehicle's side and a vehicle's back corresponding to the certain direction in which the vehicle is to advance, and (ii) the display control unit displays the captured images by the capturing devices of the over-road apparatus after displaying the captured images by the in-vehicle capturing device.

10. A method for displaying images in a display unit of a vehicle for assisting a driver of the vehicle in passing through a same intersection, the method comprising:

capturing as an image each area ranging from the same intersection to each cross road crossing at the same intersection by using a corresponding over-road capturing device around the same intersection to thereby generate and transmit captured images for all the cross roads;

detecting a traveling direction of the vehicle, the traveling direction in which the vehicle is to pass through the same intersection;

determining captured images, which are to be displayed in the display unit, from among the transmitted captured images for all the cross roads based on the detected traveling direction of the vehicle; and switching to display the determined captured images in order in the display unit according to the detected traveling direction of the vehicle when the vehicle passes through the same intersection.

11. A method for displaying images in a display unit of a vehicle for assisting a driver of the vehicle in passing through an intersection, the method comprising:

capturing as an image each area ranging from the intersection to each cross road crossing at the intersection by using a corresponding over-road capturing device around the intersection to thereby generate and transmit captured images for all the cross roads;

detecting a traveling direction of the vehicle in which the vehicle is to pass through the intersection;

determining captured images, which are to be displayed in the display unit, from among the transmitted captured images for all the cross roads based on the detected traveling direction of the vehicle;

switching to display the determined captured images in order in the display unit; and capturing as an image a side and/or a back of the vehicle by using an in-vehicle capturing device; wherein when it is determined that the vehicle is to turn to a certain direction instead of running straight at the intersection in the detecting the traveling direction of the vehicle, captured images of the side and/or the back of the vehicle, which are captured by the in-vehicle capturing device and correspond to the certain direction, are further determined in the determining captured images which are to be displayed in the display unit.

* * * * *